United States Patent [19]

Mittler et al.

[11] Patent Number: 4,575,779
[45] Date of Patent: Mar. 11, 1986

[54] VARIABLE ELECTRONIC COMPONENT

[75] Inventors: Martin A. Mittler, Lake Hiawatha; Kenneth J. Scowen, Springfield, both of N.J.

[73] Assignee: Voltronics Corporation, East Hanover, N.J.

[21] Appl. No.: 613,220

[22] Filed: May 23, 1984

[51] Int. Cl.⁴ .......................... H01G 5/04; H01C 9/02
[52] U.S. Cl. .................................... 361/296; 338/160
[58] Field of Search ................ 338/160, 158; 361/292, 361/293, 296; 24/524

[56] References Cited

U.S. PATENT DOCUMENTS

| | | | |
|---|---|---|---|
| 3,679,940 | 7/1972 | Newman et al. | 361/292 X |
| 3,757,266 | 9/1973 | Newman et al. | 338/158 |
| 3,775,647 | 11/1973 | Bowen | 361/292 |
| 4,178,622 | 12/1979 | Oxley | 361/292 X |

Primary Examiner—Donald A. Griffin
Attorney, Agent, or Firm—Lerner, David, Littenberg, Krumholz & Mentlik

[57] ABSTRACT

A variable electronic component for use in a subminiature electronic circuit and adapted to provide a desired range of impedance characteristics. The variable electronic component may take the form of a variable trimmer capacitor, a variable resistor, and the like constructed to include an eccentric whose rotational motion imparts reciprocal movement to an impedance varying member. The eccentric is operative by engagement with an implement such as a screwdriver and the like.

24 Claims, 5 Drawing Figures

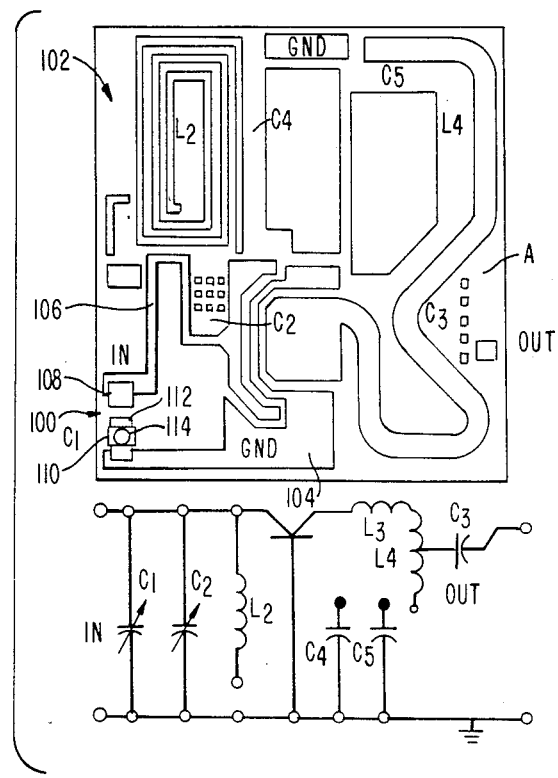
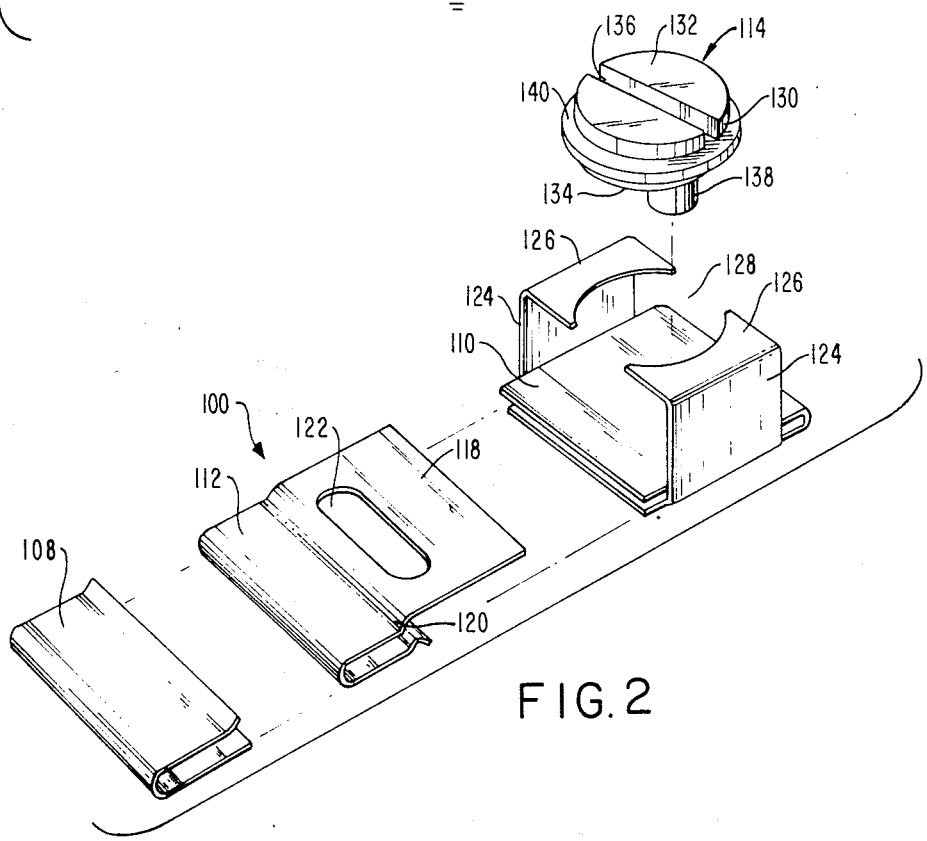
FIG. 1
FIG. 2

VARIABLE ELECTRONIC COMPONENT

BACKGROUND OF THE INVENTION

The present invention relates in general to a variable electronic component, and more particularly, to a variable trimmer capacitor and variable resistor adapted to provide an operative range of impedance characteristics by operation of an eccentric using an implement such as a screwdriver or the like.

In the advancing technologies of computers, testing equipment, appliances and other fields, various types of hybrid electronic circuits, integrated electronic circuits, micro strip amplifiers, micro electronic systems and other electronic devices are being developed and which are being made on increasingly smaller scale and size than has been known theretofore. In accomplishing this end, the enumerated devices are generally mounted on small flat insulating bases known as substrates. These various devices incorporate or have formed therein or coact with various types of electronic components such as inductors, capacitors, resistors, potentiometers, etc., which in turn must be as small as possible to meet the demands of the reduced scale or size of these devices.

The known prior act miniature devices have reached their functional limit even with the best precision manufacturing techniques because certain elements of these devices cannot be reduced further at reasonable costs for commercially acceptable regularly usable devices. For example, the present known prior art variable trimmer capacitors heretofore used in miniature electronic circuits require a mounting frame and a tuning mechanism. There is a limit as to how these elements can be miniaturized and still provide effective and proper function. Further, the mounting elements and tuning mechanisms, when connected in miniature electronic circuits handling high frequencies create unwanted inductance and capacitance in the systems and devices in which they are used because they form stray current paths when placed in close proximity to each other, as may be required in miniature systems or small electronic designs, thereby producing unwanted circuit interaction such as excessive coupling.

U.S. Pat. Nos. 3,679,940 and 3,757,266, which patents are assigned to the same assignee of the within invention, each disclose variable electronic components, such as capacitors and resistors, which are particularly adapted to meet and overcome the problems of these prior art devices by eliminating the area and mass of conventional mounting frames, tuning mechanisms and other elements heretofore used; and instead integrate the elements of these variable electronic components directly into the circuit. These components are primarily designed as low profile structures exceedingly small in size, simple in construction, easily adjustable, reliable in operation, easily replaceable, and reproducible in quantity without sacrificing uniformity or performance.

However, owing to the exceedingly small size of these variable electronic components, the ability to readily adjust these components have likewise become exceedingly more difficult. These components have been provided with an up-turned tab to be engaged by a suitable adjusting tool, for example, a tweezer, so as to affect the desired operative range of impedance characteristics of the component. As these components become increasingly smaller in size, it can be appreciated that there is a need to provide a more accurate and reliable means for providing the requisite adjustment.

To this end, the prior art has included in these variable electronic components a rack and pinion assembly operative upon rotation by a miniature screwdriver. However, the extremely small size of these components have rendered the construction of a rack and pinion assembly having extremely small gear teeth relatively difficult and expensive, subject to breakage and stripping, and thereby rendering its use less than desirable.

Accordingly, it can be appreciated that there is an unsolved need for providing a variable electronic component, such as a variable trimmer capacitor and variable resistor which can provide a desired operative range of impedance characteristics quickly, simply, and inexpensively by adjustment using a suitable implement such as a screwdriver and the like.

SUMMARY OF THE INVENTION

It is broadly an object of the present invention to provide a variable electronic component which overcomes or avoids one or more of the foregoing disadvantages resulting from the use of the above-mentioned prior art variable electronic components, and which fullfills the specific requirements of such a variable electronic component for use in subminiature electronic circuits disposed on a supporting substrate. Specifically, it is within the contemplation of one aspect of the present invention to provide a variable electronic component which includes means to facilitate the adjustment of the component to provide a desired operative range of impedance characteristics as such component becomes increasingly smaller in size.

A further object of the present invention is to provide a variable electronic component in which the part or parts thereof are independently mountable in a current conducting circuit disposed on an associated substrate.

A still further object of the present invention is to provide a variable electronic component which is relatively small and cheap to build, and wherein the area and mass of conventional mounting means and tuning means of the known prior art devices are substantially eliminated.

A yet still further object of the present invention is to provide a variable electronic component particularly adapted for use in high frequency subminiature electronic systems and devices.

A yet still even further object of the present invention is to provide a variable electronic component which is relatively easy to adjust to provide fine tuning for the electronic circuit in which it will be used.

In accordance with the present invention there is provided a variable electronic component for use in a subminiature electronic circuit disposed on a supporting substrate. The variable electronic component is constructed of conductive contact means supportable on the substrate for contacting a portion of the electronic circuit, impedance varying means movably mounted relative to the conductive contact means for providing a desired range of impedance characteristics of the variable electronic component, and eccentric means for moving the impedance means relative to the conductive contact means.

Further in accordance with the above embodiment, there is provided guide means attached to the conductive contact means in operative relationship with the impedance varying means to prevent relative sidewise movement of the impedance varying means during movement thereof by the eccentric means.

Still further in accordance with the above embodiment, the impedance varying means includes a planar extension arranged underlying the eccentric means and provided with a slot arranged having its longitudinal axis normal to the direction of movement of the impedance varying means.

Still even further in accordance with the above embodiment, the eccentric means is constructed of a body adapted for rotation about its axis and an eccentrically mounted cylinder engaged within the slot, the rotation of the body about its axis causing reciprocal movement of the impedance varying means.

BRIEF DESCRIPTION OF THE DRAWINGS

The above description, as well as further objects, features and advantages of the present invention will be more fully understood by reference to the following detailed description of a presently perferred, but nonetheless illustrative, variable electronic component in accordance with the present invention, when taken in conjection with the accompanying drawings, wherein:

FIG. 1 is a highly enlarged plan view of a micro-lumped thin film circuit having a variable trimmer capacitor thereon constructed in accordance with the present invention;

FIG. 2 is an enlarged exploded view of the variable trimmer capacitor as shown in FIG. 1, and showing its construction of a first and second conductive contact member, an impedance varying member, and an eccentric;

DETAILED DESCRIPTION

Figure 3:
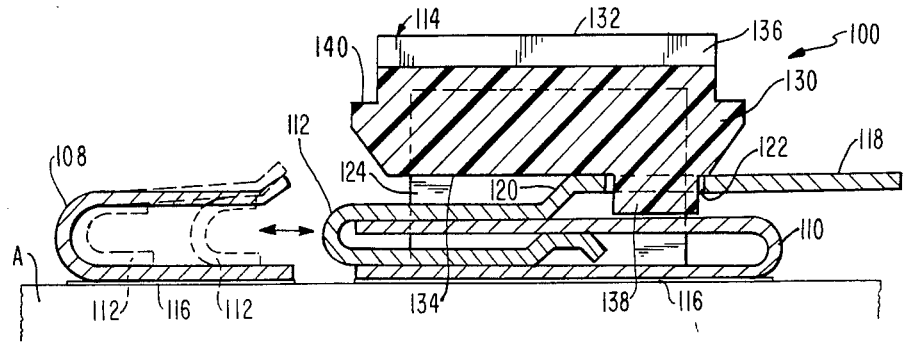
FIG. 3 is a cross-sectional view taken along Line 3—3 of FIG. 4 showing the impedance varying member phantomized in various positions of engagement between the first and second conductive contact member.

Referring to the drawings, FIG. 1 illustrates an electronic circuit which includes a variable electronic component, which in accordance with one embodiment of the present invention comprises a variable trimmer capacitor generally designated as 100. In accordance with the present invention, the variable trimmer capacitor 100 is applied to a subminiature electronic circuit of the micro-lumped thin film construction, generally designated as 102, and which is used, for example, in 2 GHz 5 watt power amplifiers. The electronic circuit is illustrated in highly enlarged form as its actual dimensions are about one square inch. The variable trimmer capacitor 100 as illustrated will have actual approximate dimensions and sizes as follows—height 0.090 inch, width 0.020 inch and length 0.270 inch. A variable trimmer capacitor 100 with these dimensions will have a capacitance range from 0.5 pf to above 9.0 pf (pico farads); minimum voltage ratings will be 100 volts D.C. and a "Q" over 1,000 at 100 GHz.

It is noted that in all forms of the present invention illustrated in the various figures to be described hereinafter, that the elements are also shown in highly enlarged form to more clearly illustrate the construction and arrangement thereof. It will be understood that these forms of the invention may also have dimensions similar to those above indicated for the variable trimmer capacitor 100 illustrated in FIGS. 2 and 4 of the drawings.

The micro-lumped thin film construction 102 shown in FIG. 1 comprises a substantially planar member having an alumina substrate generally designated A which is metalized and etched on at least one side to form current carrying sections 104 and strips 106 to provide an electronic circuit. One of the current carrying sections 104 is maintained intact as the ground plane, while the current carrying strips 106, and other strips in spaced relationship, provide a plurality of patterns which form the functional components of the circuit indicated by the letters "C" for capacitors and "L" for inductors. Such forms of circuitry are well known in the prior art and must be made with great precision. FIGS. 1 and 2 further show that the variable trimmer capacitor 100 includes a first conductive contact member 108 connected to the current carrying strips 106 of the electronic circuit disposed on the substrate A. Spaced therefrom is a second conductive contact member 110 also made of conductive material and connected to the current carrying sections 104 forming the ground plane GND and opposite in the circuit from the current carrying strips 106 to which the first conductive contact member 108 is connected.

The second conductive contact member 110 is so spaced that an impedance varying member 112, mounted on the second conductive contact member, can be moved into and out of engagement with the first conductive contact member 108 by operation of an eccentric 114. The coaction between the impedance varying member 112 and the first contact member 108 will perform the operative function of the variable trimmer capacitor 100 as is explained more fully hereinafter. The variable trimmer capacitor 100 is affixed in properly adjusted position for the desired interrelation between the impedance varying member 112 and the first conductive contact member 108 and second conductive member 110 as by solder means 116 for affixing these members to the electronic circuit as shown in FIG. 3. Alternatively, these members 108, 110, and 112 of the variable trimmer capacitor 100 can be affixed directly to the substrate A and connected by suitable lead lines, not shown, to the current conducting sections 104 and the current conducting strips 106 of the electronic circuit formed on the substrate A. Thus, there is no independent mounting frame or other means provided for the members 108, 110, and 112 of the variable trimmer capacitor 100. In other words, the members 108, 110 and 112 are integrated directly into the electronic circuit as a component thereof.

The first conductive contact member 108 and the second conductive contact member 110 may be made of substantially similar materials. One such material particularly adapted for this purpose is a beryllium copper alloy. This material is desirable for this purpose in that it is a fine grained metal which conducts current well. It can be easily shaped, can be hardened into and will retain a shape or configuration such as the U-shape or hairpin shape of the respective members 108 and 110, as shown in side elevation in FIG. 3 of the drawings. Alternatively, other materials such as nickel-chromium-steel alloys or phosphor bronze alloys may be used. Additionally, the first and second conductive contact members 108 and 110 can be gold plated or silver plated by any suitable means as this will make these members non-corrodable, give them high electrical conductivity and facilitate soldering them to the electronic circuit in which the variable trimmer capacitor 100 will be used. The impedance varying member 112 of U-shape or hairpin shape is preferably made of stainless steel alloy 302. This is a nickel-chromium alloy which is commercially available on the open market. It is spring-like non-corrodable and non-solderable by the conventional techniques applicable to the first and second conductive contact members 108 and 110. Thus, when the variable trimmer capacitor 100 is affixed in assembled position in the electronic circuit, the impedance varying member 112 will not be affected by the soldering action required for such assembly.

To provide the desired function as a capacitor in the electronic circuit, the entire outer face of the impedance varying member 112, i.e., the surface facing and to be brought into engagement with the inner surface of the first conductive contact member 108 will be coated to the desired thickness with a suitable dielectric material such as polytetrafluoroethylene. It will be understood that other dielectric materials such as the ceramic coatings presently in use on piston type variable trimmer capacitors could also be applied to the outer surface of the impedance varying member 112 to accomplish the same result. Alternatively, the inner surface of the first conductive contact member 108 could be coated with such dielectric material or other techniques could be used to establish the desired capacitance without departing from the spirit or scope of this invention.

It is thought clear from FIGS. 1 through 4 that the members 108, 110, and 112 of the variable trimmer capacitor 100 are shown to have no independent mounting means and that these members are independently and directly connected into the electronic circuit itself, hence they are supported by the same substrate A that supports the circuit. The only requirement to get effective operation is to so space the first conductive member 108 and the second conductive member 110 such that the movable impedance varying member 112 can be brought into and out of full engagement with the first conductive contact member 108, as is shown by the phantomized lines in FIG. 3 of the drawings. The construction of the members 108, 110, and 112 of the variable trimmer capacitor 100 and their operational interrelation is fully described in the above cited U.S. Pat. No. 3,679,940.

Specifically with regard to the invention, the impedance varying member 112 is provided with a planar extension 118 connected thereto by a rise 120. The extension 118 is provided with a slot 122 arranged having its longitudinal axis normal to the direction of movement of the impedance varying member. The second conductive contact member 110 is provided with a pair of spaced apart upstanding guides 124 having a pair of inwardly opposing tabs 126 defining an opening 128 therebetween. The opening 128 is adapted to rotationally receive the eccentric 114 therein, while the guides 124 act fundamentally to prevent sidewise movement or slippage of the impedance varying member 112 during movement or when in its adjusted position. The eccentric 114 is constructed of a generally cylindrical body 130 having a pair of planar parallel spaced opposing surfaces 132 and 134. The upper planar surface 132 is provided with a notch 136 adapted to be engaged by a miniature screwdriver of other such implement as to be described hereinafter. The lower planar surface 134 is provided with an outwardly extending eccentrically mounted cylinder 138. The geometric center of the cylinder 138 differs from the axis of rotation of the body 130. The eccentric 114 can be constructed of suitable dielectric or metallic material such as nylon, Teflon, die-cast zinc, and the like.

Figure 4:
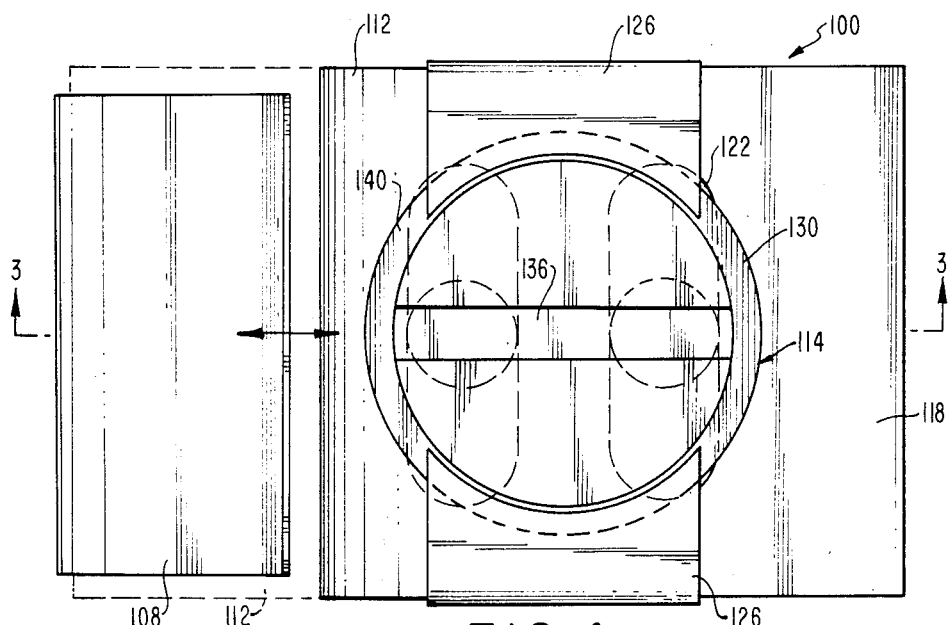
FIG. 4 is a top plan view of the assembled variable trimmer capacitor as shown in FIG. 1.

The variable trimmer capacitor 100 is shown in its assembled form in FIGS. 3 and 4. In its assembled form, the impedance varying member 112 is arranged having the planar extension 118 overlying the upper surface of the second conductive contact member 110 and confined between the pair of upstanding guides 124. The extension 118 is arranged generally in a plane parallel to a plane containing the substrate A. The eccentric 114 is rotationally mounted within the opening 128 formed between the scalloped edges of the tabs 126. The eccentrically mounted cylinder 138 is engaged within the slot 122 provided within the underlying extension 118 of the impedance varying member 112. The eccentric 114 is prevented from removal from the second conductive contact member 110 by the engagement of the scalloped edges of the tabs 126 overlying a lip 140 provided subscribing the eccentric.

The operation of the variable trimmer capacitor 100 will now be described with respect to FIGS. 3 and 4. By rotating the eccentric 114 about its axis, as with any suitable adjusting tool, such as a screwdriver engaged within the notch 136, the impedance varying member 112 can be moved forward and back as indicated by the arrow between a minimum and maximum position. In this regard, the eccentric 114 is operative to convert rotational movement to reciprocal movement. The minimum position of the impedance varying member 112 is shown in FIGS. 3 and 4 by the impedance varying member being disposed laterally to its right most position upon rotation of the eccentric 114. This is the minimum capacitance position for the capacitance range of this form of the invention. On the other hand, as illustrated by the phantomized lines in the left most portion of FIGS. 3 and 4, the impedance varying member 112 can be moved to various positions of engagement with the first conductive member 108 and the maximum capacitance position for the capacitance range of this form of the invention. The lateral reciprocal movement of the impedance varying member 112 is affected by eccentric rotation of the cylinder 138 of the eccentric 114 and its being engaged within the slot 122 of the extension 118 of the impedance varying member. It can therefore be appreciated that the variable trimmer capacitor 100 can be adjusted to provide a desired range of impedance characteristics by simple continued rotation of the eccentric 114 utilizing a screwdriver or other such implement. Furthermore, the use of an eccentric 114 results in the variable trimmer capacitor 100 being cheaper to manufacture, as well as being more reliable in use by providing for its precise adjustment in a quick, simple, and efficient manner. Therefore, the provision of the eccentric 114 in the variable trimmer capacitor 100 overcomes or avoids the disadvantages inherent in the use of the prior art devices described herein.

The foregoing construction makes it impossible to over drive the respective members 108, 110, and 112 of the disclosed variable trimmer capacitor 100 as shown in FIG. 3, while the upstanding guides 124 will prevent sidewise movement. Accordingly, disassembly of the variable trimmer capacitor 100 cannot occur in the form of the invention shown in FIG. 3. The prestressed condition of the first conductive contact member 108 will act to force the dielectric coating on the outer surface of the impedance varying member 112 into intimate engagement therewith. Since the first and second conductive contact members 108 and 110, are conductive and are now bridged by the impedance varying member 112, a relatively simple adjustable capacitor is formed.

Additionally, the compressive forces and the frictional engagement between the members 108, 110, and 112 of the variable trimmer capacitor 100 will normally be sufficient to maintain the impedance varying member 112 in any given adjusted position because the mass of the impedance varying member is so small that it has little tendency to shift positions. It is, however, relatively simple to provide positive means to prevent such movement as by ears, not shown, which may be struck inwardly on the guides 124 or detent means, not shown, can be provided to coact with the impedance varying member 112 as will be understood by those skilled in the electro-mechanical arts.

Figure 5:
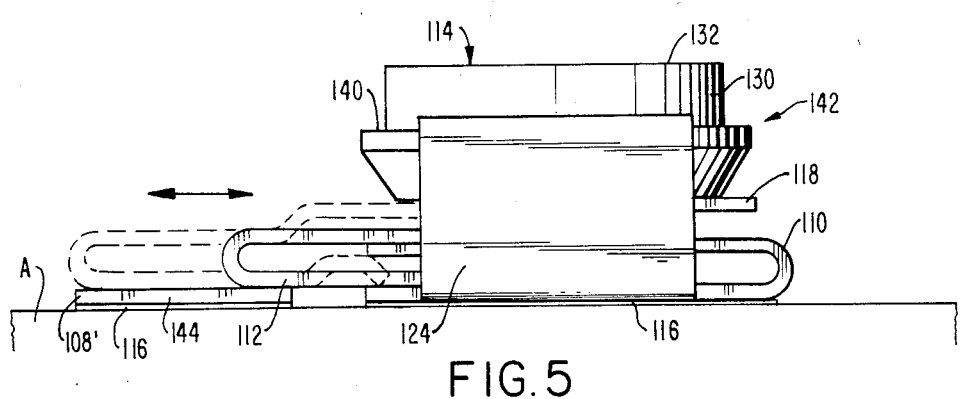
FIG. 5 is a side elevational view of a variable electronic component in the form of a variable resistor in accordance with another embodiment of the present invention.

The forms of the invention above described illustrate the use of a first conductive contact member 108 in association with a movable impedance varying member 112 to provide a variable trimmer capacitor 100, the adjustment of which provides a desired range of impedance characteristics being achieved by the 360 degree rotation of an eccentric 114 using an implement such as a screwdriver and the like. The nature of the present invention is such that the first conductive contact member 108 can be a simple flat impedance means which is affixed directly onto one side of the circuit and wherein the impedance varying member 112 is made to coact therewith to provide a variety of subminiature electrical components. This form of the present invention is shown in FIG. 5 in the form of a variable resistor 142.

As shown, the first conductive contact member 108' is constructed of a flat resistor member 144, which may be any suitable type of resistor. The resistor member 144 is in electrical connection with one side of the electronic circuit which is disposed on the substrate A. While a single resistor member 144 is shown, it is to be understood that instead of a single resistor, a plurality of spaced resistance elements or a plurality of switch contacts could also be used in place of the single resistor member without departing from the spirit and scope of the present invention as will be understood by those skilled in the art. By rotation of the eccentric 114, the impedance varying member 112 can be laterally moved from its position shown in FIG. 5 to that shown in the phantomized lines to provide a desired range of impedance characteristics to the variable resistor 142.

Thus, as has been illustrated above, there has been provided a simple variable electronic component of great versatility and with a minimum of members adapted to be made, in particular, for very small size electronic circuits. The variable electronic component is characterised by the fact that the members thereof are independently and directly connected to the electronic circuit and which can be adjusted over a desired range of impedance characteristics using an eccentric 114. The members of the variable electronic component further are so constructed that they have good electrical contact at all times and substantial misalignment can occur without interfering with this electrical connection between the members. Thus, in contrast to many miniature prior art devices, the variable electronic components herein disclosed produce limited or very little electrical noise, having low contact resistance and minimal electrical inductance in use and in assembled relationship in the electronic circuit to which they are connected. Further, the variable electronic components can be readily and simply adjusted by means of conventional implements such as screwdrivers and the like.

Although the invention herein has been described with reference to particular embodiments, it is to be understood that these embodiments are merely illustrative of the principals and application of the present invention. It is therefore to be understood that numerous modifications may be made in the illustrative embodiments and that other arrangements may be devised without departing from the spirit and scope of the present invention as defined by the appending claims.

What is claimed is:

1. A variable electronic component for use in a subminiature electronic circuit disposed on a supporting substrate, said variable electronic component comprising conductive contact means supportable on said substrate for contacting a portion of said electronic circuit, impedance varying means movably mounted relative to said conductive contact means for providing a desired range of impedance characteristics of said variable electronic component, said impedance varying means including a slot arranged having its longitudinal axis substantially normal to the direction of movement of said impedance varying means, and eccentric means engaging said slot for moving said impedance means relative to said conductive contact means.

2. The variable electronic component of claim 1, including guide means attached to said conductive contact means in operative relationship with said impedance varying means to prevent relative sidewise movement of said impedance varying means during movement thereof by said eccentric means.

3. The variable electronic component of claim 2, wherein said eccentric means is rotationally mounted between said guide means overlying a portion of said conductive contact means.

4. The variable electronic component of claim 2, wherein said guide means includes a pair of inwardingly extending opposing tabs defining an opening therebetween.

5. The variable electronic component of claim 4, wherein said eccentric means is rotationally mounted between said tabs within said opening.

6. The variable electronic component of claim 1, wherein said impedance varying means includes an extension arranged underlying said eccentric means and including said slot.

7. The variable electronic component of claim 6, wherein said extension is arranged substantially parallel to said supporting substrate.

8. The variable electronic component of claim 1, wherein said eccentric means comprises a body adapted for rotation about its axis and an eccentrically mounted cylinder engaged within said slot, the rotation of said body about its axis causing reciprocal movement of said impedance varying means.

9. The variable electronic component of claim 8, wherein the geometric center of said cylinder differs from the axis of rotation of said body.

10. The variable electronic component of claim 8, wherein said body includes a slot to facilitate the rotation thereof by engagement with an implement.

11. The variable electronic component of claim 1, wherein said impedance varying means includes a dielectric coating for establishing the impedance characteristics of said variable electronic component.

12. A variable electronic component for use in a subminiature electronic circuit disposed on a supporting substrate, said variable electronic component comprising first conductive contact means supportable on said substrate for contacting a portion of said electronic circuit, second conductive contact means supportable on said substrate for contacting another portion of said electronic circuit, impedance varying means movably mounted relative to said first and second conductive contact means for providing a desired range of impedance characteristics of said varying electronic component, said impedance varying means including a slot arranged having its longitudinal axis substantially normal to the direction of movement of said impedance varying means, and eccentric means engaging said slot for moving said impedance varying means relative to said first and second conductive contact means.

13. The variable electronic component of claim 12, wherein said eccentric means is rotationally mounted overlying a portion of said second conductive contact means.

14. The variable electronic component of claim 12, wherein said eccentric means comprises a body adapted for rotation about its axis and an eccentrically mounted cylinder arranged within said slot, the rotation of said body about its axis causing reciprocal movement of said impedance varying means.

15. The variable electronic component of claim 14, wherein the geometric center of said cylinder differs from the axis of rotation of said body.

16. The variable electronic component of claim 15, wherein said body includes a slot to facilitate the rotation thereof by engagement with an implement.

17. The variable electronic component of claim 12, wherein said impedance varying means is movably mounted within said second conductive contact means and includes a dielectric coating deposited thereon for establishing the impedance characteristics of said variable electronic component.

18. A variable electronic component for use in a subminiature electronic circuit disposed on a supporting substrate, said variable electronic component comprising conductive contact means supportable on said substrate for contacting a portion of said electronic circuit, impedance varying means movably mounted relative to said conductive contact means for providing a desired range of impedance characteristics of said variable electronic component, and eccentric means rotationally mounted about an axis for reciprocally moving said impedance varying means relative to said conductive contact means upon rotation of said eccentric means in a clockwise or counterclockwise direction.

19. The variable electronic component of claim 18, wherein said impedance varying means includes a slot arranged having its longitudinal axis substantially normal to the direction of movement of said impedance varying means.

20. The variable electronic component of claim 19, wherein said eccentric means comprises a body adapted for rotation about said axis and an eccentrically mounted cylinder engaged within said slot, the rotation of said body about said axis causing continuous reciprocal movement of said impedance varying means.

21. A variable electronic component for use in a subminiature electronic circuit disposed on a supporting substrate, said variable electronic component comprising conductive contact means supportable on said substrate for contacting a portion of said electronic circuit, impedance varying means movably mounted relative to said conductive contact means between minimum and maximum impedance positions for providing a desired range of impedance characteristics of said variable electronic component, and eccentric means rotationally mounted about an axis for moving said impedance varying means relative to said conductive contact means between said minimum and maximum impedance positions upon rotation of said eccentric means through 180 degrees.

22. The variable electronic component of claim 21, wherein said impedance varying means includes a slot arranged having its longitudinal axis substantially normal to the direction of movement of said impedance varying means.

23. The variable electronic component of claim 22, wherein said eccentric means comprises a body adapted for rotation about said axis and an eccentrically mounted cylinder engaged within said slot, the rotation of said body about said axis causing continuous reciprocal movement of said impedance varying means.

24. The variable electronic component of claim 21, wherein said impedance varying means is moved between said minimum and maximum impedance positions upon rotation of said eccentric means in a clockwise or counterclockwise direction.

* * * * *